June 3, 1958 E. C. NELSON 2,837,732

ELECTRONIC MAGNITUDE COMPARATOR

Filed Nov. 25, 1953

INVENTOR.
ELDRED C. NELSON,
BY
Seymour M. Rosenberg
HIS ATTORNEY.

2,837,732

ELECTRONIC MAGNITUDE COMPARATOR

Eldred C. Nelson, Los Angeles, Calif., assignor, by mesne assignments, to Hughes Aircraft Company, a corporation of Delaware Application November 25, 1953, Serial No. 394,443

5 Claims. (Cl. 340—149)

This invention relates to an electronic magnitude comparator, and more particularly, to an electronic magnitude comparator for comparing and indicating the relative magnitudes of two numbers represented as two sets of binary coded electrical digit signals, respectively, by comparing the relative magnitudes of corresponding digit signals serially in the order of least significant digit first.

In the past, comparison and indication of the relative magnitudes of two numbers represented as binary coded electrical digit signals have been accomplished by subtracting one number from the other number and indicating the sign or sense of the difference, or by subtracting one of the numbers from zero, adding the difference to the other number, and indicating the sign or sense of the sum. The mechanization of such an operation requires at least an adder or subtractor circuit, and a bistable element as an indicating device.

According to the present invention, a much simpler comparator may be used where the particular code in which the numbers are expressed is one having the property that the relative magnitudes of two numbers is indicated by the sense of the nonidentity of the most significant dissimilar corresponding digits of the two numbers. As used herein, the most significant digit of a binary number, that is a number expressed in a binary code, is the digit to which the greatest absolute value of weight would be attached in deriving the decimal number equivalent of the binary code.

More particularly, the basic combination according to this invention comprises a comparison network and a bistable storage device. The comparison network is designed to receive voltage level or pulse signals representing corresponding digits of the numbers to be compared serially in the order of least significant digit first. As each pair of corresponding digit signals is applied to the comparison network, a signal is produced which represents the relative magnitudes of the two digits. This information is stored in the bistable storage device. As successive more significant corresponding digits are applied to the comparison network, the information as to relative magnitudes stored in the bistable storage device is revised, the final indication of the bistable storage element thus serving to indicate, after all digits of the two numbers have been applied, the relative magnitudes of the two numbers.

Before considering specific embodiments of the present invention designed to carry out the comparison process thus defined, certain fundamental bases of the binary system of enumeration will be discussed. According to the binary system of enumeration, particular digits of numbers are represented as either zeros or ones, the one digit conventionally being considered to be of greater relative magnitude than the zero digit. Multidigit binary numbers are similarly by convention written with the digits arranged in the order of digit significance, a number of greater magnitude being a number which has a one digit in a more significant digit place than another number whose most significant one digit appears in a digit place of less significance.

In considering the relative magnitudes of binary numbers, it will be recognized that there are three possible conditions of relative magnitude between two numbers, that is, first number greater than second number, first number equal to second number, and first number less than second number.

While it is possible to devise comparators based upon a recognition of the uniqueness of these three possible conditions of relative magnitude, such comparators would require a storage device having three stable states. In a large proportion of mathematical problems sufficient information as to relative magnitudes of two numbers will be afforded by a comparator which merely indicates two conditions of relative magnitude, that is first number larger than second number and first number smaller than or equal to second number. A comparator devised to treat relative magnitudes in this manner might regard equality of the numbers as the same as the first number being the larger of the numbers or as the same as the second number being the larger of the numbers. Such comparators would require only a bistable storage device since only two conditions of relative magnitude need be recognized.

In the various embodiments of the present invention set forth hereafter it will be shown that a comparator mechanized according to these principles need only include within the comparison network means responsive to non-identical digit signals, and that the equality condition of the numbers may be provided for by additional means to give the bistable storage device an initial setting before the comparison process is carried out. As will be later shown this initial setting conditions the response of the comparator in such a manner as to provide an appropriate indication in accordance with the above principles.

Accordingly, the basic combination of the present invention includes a bistable storage device, and a comparison network including first means responsive to applied digit signals for applying a signal to the storage device to set the storage device to one of its stable states when corresponding digit signals are dissimilar in one sense; and second means responsive to applied digit signals for applying a signal to the storage device to set the storage device to the other of its stable states when the digit signals are dissimilar in another sense.

Where it is desired to provide a unique indication of the condition of equality, the basic combination of the present invention may be modified by including an additional storage device responsive to the output signals of the comparison network to indicate equality or non-equality of the applied digit signals.

The comparison network of the present invention may be designed to receive digit signals expressed in either pulse or voltage level form. Similarly, the bistable storage device which stores the comparison information may be any of a number of well-known bistable storage devices such as electrostatic storage devices, magnetic recording devices, mercury delay lines, etc. Because of the small amount of information which need be stored throughout the comparison operation, the bistable storage device may conveniently be a conventional Eccles-Jordan multivibrator having two stable states and being responsive to signals applied to either of its two input terminals to set to the corresponding stable state.

It is therefore, an object of the present invention to provide an electronic magnitude comparator for comparing and indicating the relative magnitudes of two binary digits expressed as bivalued electrical signals, respectively, which is simple, reliable and requires a minimum amount of power for its operation.

Another object of the present invention is to provide a comparator for comparing and indicating the relative magnitudes of two numbers represented as two sets of binary coded electrical digit signals, respectively, by comparing the relative magnitudes of corresponding digit signals.

A further object of the present invention is to provide an electronic magnitude comparator which sequentially compares corresponding digit signals of two sets of binary coded electrical digit signals representing two numbers, respectively, in the order of least significant digit first and instantaneously indicates the relative magnitudes of the two numbers.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressely understood, however, that the drawings are for the purpose of illustration and description only, and are not intended as a definition of the limits of the invention.

Figure 1:
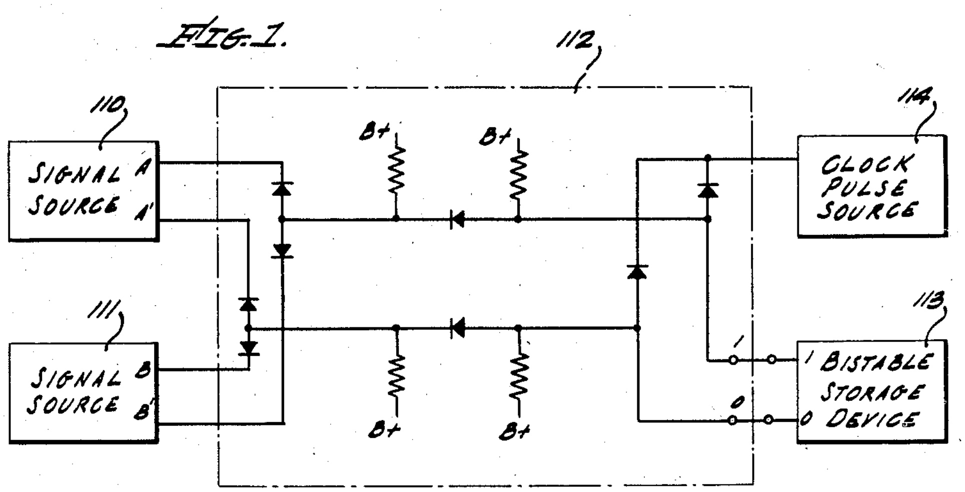
Fig. 1 is a composite diagram of an electronic magnitude comparator according to the present invention which provides for the comparison of digits and numbers expressed as voltage level signals.

Referring now to the drawings, in which like reference characters represent the same or equivalent elements in the several embodiments, there is shown in Fig. 1 a composite diagram of an electronic magnitude comparator according to the present invention for comparing two numbers expressed as two sets of binary coded electrical digit signals, respectively. As shown in Fig. 1, the comparator includes a pair of signal sources 110 and 111 for supplying complementary input signals A, A′ and B, B′, respectively, representing in bilevel voltage form the successive digits of first and second numbers to be compared, to a comparison network 112 which in turn supplies its output signals to a bistable storage device 113, such as multivibrator.

More specifically, input signal source 110 produces relatively high and low level signals on output terminals A and A′, respectively, when the signal supplied represents a "1" digit of the first number and produces relatively low and high voltage level signals on output terminals A and A′, respectively, when the signals supplied represent a "0" digit of the first number. Input signal source 111 produces similar high and low level signals on output terminals B and B′ when the signals supplied represent "1" and "0" digits for the second number.

Comparison network 112 includes first and second logical "and" networks, each having two signal input terminals, a clock pulse input terminal, and an output terminal and being responsive to the simultaneous application of a clock pulse signal and "1" digit signals to both its signal input terminals to pass the clock pulse signal to its output terminal. The two signal input terminals of the first logical "and" network of comparison network 112 are connected to the A and B′ output terminals, respectively, of input signal sources 110 and 111, while the two signal input terminals of the second logical "and" network of comparison network 112 are connected to the A′ and B output terminals, respectively, of input signal sources 110 and 111. A source 114 of clock or comparison pulses is connected to the clock pulse input terminals of both the first and second logical "and" circuits. The output terminals of the first and second logical "and" circuits are designated as the "1" and "0" output terminals, respectively, of comparison network 112.

Accordingly, comparison network 112 is responsive to pass a clock pulse to its "1" output terminal when a digit signal supplied by digit signal source 110 represents a "1" digit and the corresponding digit signal supplied by digit signal source 111 represents a "0" digit. Comparison network 112 passes a clock pulse to its "0" output terminal when the corresponding digit signals supplied by input signal sources 110 and 111 represent "0" and "1" digits, respectively.

The "1" and "0" output terminals of comparison network 112 are connected to the "1" and "0" input terminals, respectively, of a bistable storage device 113. Bistable storage device 113, which may be a conventional Eccles-Jordan multivibrator heretofore described, is so arranged that in response to signals applied to its "1" input terminal the bistable storage device is set to one of its stable states, which may be designated the "1" stable state; while in response to signals applied to its "0" input terminal, the bistable storage device is set to the other of its stable states, which may be designated the "0" stable state.

Thus, it is seen that if signals A and B′ are each at a comparatively high voltage level corresponding to a "1" digit for the first number and a "0" digit for the second number and a clock pulse is applied to network 112, bistable storage device 113 will be set to its "1" state, while if signals A′ and B are each at a comparatively high voltage level corresponding to a "0" digit for the first number and a "1" digit for the second number, and a clock pulse is applied to network 112, the bistable storage device will be set to its "0" state. A reset signal from a reset signal source, not shown, may be used to apply a reset signal to the appropriate input terminal of the bistable storage device whenever it is desired to arbitrarily set the storage device to one of its stable states, as for example, prior to the comparison of two numbers.

Considering now the response of the comparator thus described when used to compare two multidigit binary numbers A and B, bistable storage device 113 may initially be set to its "0" state by means of an appropriately applied reset signal. To carry out the comparison operation, sources 110 and 111 may apply the signals representing the two numbers to comparison network 112 in the order of least significant digit signal first, corresponding digit signals being applied at the same time.

Figure 3:
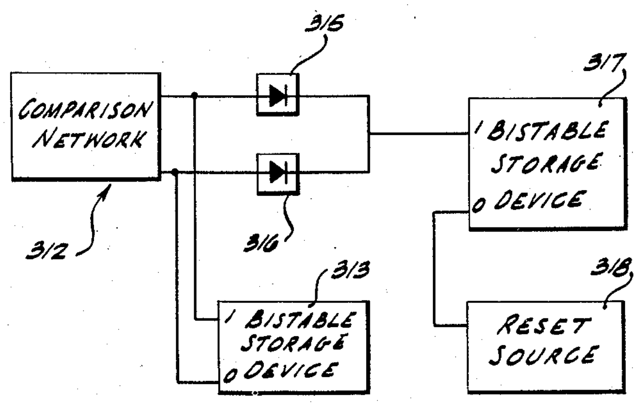
Fig. 3 is a composite diagram of another embodiment according to the present invention for indicating all of the three possible conditions of relative magnitude between two binary numbers.

Upon application of each pair of input signals, clock pulse source 114 applies a clock pulse to the comparison network. As each pair of corresponding digit signals is successively applied to the comparison network, bistable storage device 113 will accordingly be set to a state indicative of the sense of the nonidentity between nonidentical digit signals, while for identical digit signals no setting operation will take place. Since the digit signals are appled least significant digit first, the state of the bistable storage device after all digit signals have been applied will be a direct indication of the sense of the nonidentity of the last applied or most significant nonidentical digit signals.

Where the two numbers to be compared are identical and therefore each pair of corresponding digit signals are identical the bistable storage device will remain in its initial state throughout the period of application of the input signals. Thus, where the bistable storage device has been initially set to its "0" state and is in its "0" state following the application of all digit signals, this is interpreted as either an indication of relative magnitude in the sense heretofore noted or as an indication of identity, that is number A less than or equal to number B. On the other hand, a "1" setting at the end of the comparison operation indicates A is greater than B. Alternatively, it may be desirable to have the equality condition and the condition A larger than B be indicated by a "1" setting of the bistable storage device and the relation A less than B by a "0" setting of the storage device. This may be accomplished by initially setting the storage device to its "1" state. In this manner, in the absence of nonidentical digit signals, the bistable storage device will remain in its "1" state throughout the comparison operation, thus indicating the equality condition. Since an identical indication will result if A is larger than B, a final "1" setting must be interpreted as indicating either a condition of equality or that A is greater than B.

Where it is desired to further distinguish the equality condition, the embodiment of the invention shown in Fig. 3 or other systems well known in the art may be utilized.

Figure 2:
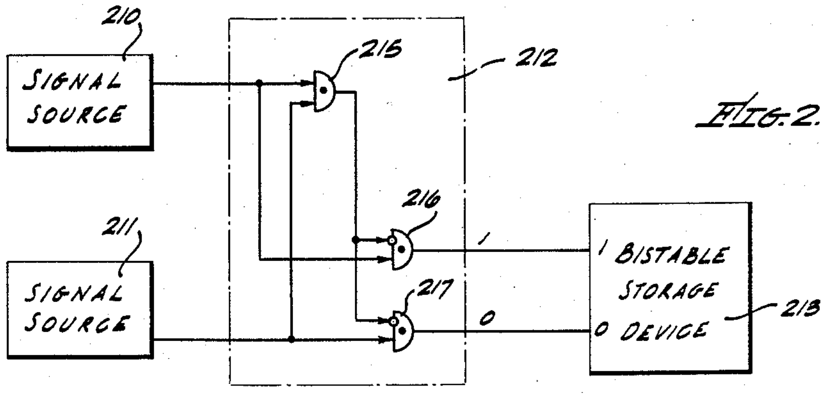
Fig. 2 is a composite diagram of another embodiment of the comparator of the present invention for comparing two numbers expressed as pulse signals.

Alternatively, where the supplied digit signals are supplied in pulse form the comparator circuit may be mechanized in accordance with the embodiment of the invention shown in Fig. 2. As shown in Fig. 2, the embodiment includes a pair of input signal sources 210 and 211 for supplying signals A and B, respectively, representing in pulse form first and second numbers to be compared to a comparison network 212 which, in turn, supplies its output signals to a bistable storage device 213.

More particularly, the signals supplied by signal source 210 represent in pulse form the successive digits of the first number A in the order of least significant digit first. The binary digit "1" may be represented by the presence of a pulse during a particular time interval while the binary digit "0" may be represented by the absence of a pulse during a particular time interval. Signal source 211 supplies similar signals in respect to the second number B to be compared. Comparison network 212 is responsive to the applied digit signals, to produce an output pulse on its "1" output terminal when the digit signals supplied by sources 210 and 211 represent "1" and "0" digits, respectively, and an output pulse on its "0" output terminal when the signals supplied by signal sources 210 and 211 represents "0" and "1" digits, respectively. No output pulse is produced on either output terminal when the supplied digit signals represent identical "1" or "0" digits.

The mechanization of network 212 to respond in the above manner may be better understood by considering the specific embodiment of the network shown in Fig. 2. As shown in Fig. 2, the network includes a two-input terminal coincidence gate 215 and two inhibition gates 216 and 217. Coincidence gate 215, which is responsive to the simultaneous application of input pulses to both of its inputs to produce an output pulse, has its input terminals connected to signal sources 210 and 211, respectively, and its output terminal connected to the inhibition input terminal of inhibition gates 216 and 217. Inhibition gates 216 and 217 have their normal input terminals connected to signal sources 210 and 211, respectively. Each of the inhibition gates is responsive to a pulse signal applied to its normal input terminal to pass the pulse to its output terminal in the absence of a pulse simultaneously applied to its inhibition input terminal, while with the simultaneous application of a pulse to both input terminals no pulse will be passed by the gate. The output terminals of inhibition gates 216 and 217, in turn, are connected to the "1" and "0" output terminals, respectively, of comparison network 212. It will thus be seen that the application of corresponding "0" pulse input signals to comparison network 212 produces no output signal from the comparison network. If corresponding "1" pulse input signals are applied from signal sources 210 and 211, coincidence gate 215 produces an output signal inhibiting the passing of either of the applied input pulses by either gate 216 or 217 and, therefore, no output signal is produced by the comparison network.

If, on the other hand, nonidentical input signals are simultaneously supplied by sources 210 and 211, coincidence gate 215 will not produce an output signal, and accordingly, whichever of gates 216 or 217 receives the "1" pulse input signal of the nonidentical pair will pass this pulse to its output terminal which, in turn, will set bistable storage device 213 to a corresponding state.

The comparator thus described may be used to compare two multidigit binary numbers in a manner similar to the comparator of Fig. 1. Bistable storage device 213 may be set to one of its stable states prior to the initiation of the comparison operation. To compare the two numbers, sources 210 and 211 supply their signals in the order of least significant digit signal first, corresponding digit signals at the same time. Comparison network 212 produces output signals in response to applied digit signals in accordance with the previous discussion, thereby setting bistable storage device 213 to an appropriate state depending on the output signal produced by the comparison network. The interpretation of the final setting of bistable storage device 213 as an indication of the relative magnitudes of the two numbers being compared is identical to that of the embodiment of the invention shown in Fig. 1.

It should be noted that the embodiment of the invention shown in Fig. 2 requires that, in the case of corresponding identical "1" digit signals, the pulses be of such form as to cause coincidence gate 215 to produce an output signal throughout the digit comparison interval. Such a response may be achieved by providing that the pulses produced by signal sources 210 and 211 occur simultaneously in time and be of equal duration. It should be understood however that other techniques well known in the art may be used to achieved this same result.

Where it is desired to further distinguish the equality condition from the condition greater than or less than, the comparator according to this invention may take the form shown in Fig. 3 to provide an indication of equality or nonequality. As shown in Fig. 3, the comparator includes a comparison network 312 which may be similar to the comparison networks previously described, a bistable storage device 313 for indicating the sense of the nonequality of the supplied signals in the manner previously described, a pair of blocking diodes 315 and 316 and a bistable storage device 317 for indicating equality or nonequality of the supplied digit signals. A reset signal source 318 is connected to one of the input terminals of bistable storage device 317 to set the device to one of its stable states prior to the initiation of the comparison operation. More specifically, comparison network 312 may be similar to the comparison networks described in connection with the previous embodiments of the invention and includes "1" and "0" output terminals for supplying output signals, indicating non-equalities between the numbers being compared, to bistable storage device 313. The output terminals are also connected through blocking diodes 315 and 316, respectively, to one of the input terminals of bistable storage device 317. The blocking diodes constitute a buffer circuit for preventing a signal appearing on one of the output terminals of the comparator network from being fed back through the common connection to the other output terminal of the network.

Considering now the response of the comparator thus described, prior to the initiation of the comparison operation bistable storage device 317 may be set to one of its stable states by means of a reset signal supplied by reset source 318. Signals representing the numbers being compared may then be supplied to the comparison network as has been previously described. So long as the digit signals being supplied are identical, no signal will appear on either the "1" or "0" output terminal of comparison network 312 and accordingly, bistable storage devices 313 and 317 will remain in their initial states. However, upon the application of non-identical digit sigals to the comparison network, a signal will appear on one of the output terminals of the comparison network and will set bistable storage device 313 in the manner previously described. This signal will also be passed by the corresponding blocking diode and set bistable storage device 317 to the other of its stable states. Once storage device 317 is set to its other stable state, it will remain in that state until a reset signal is again applied.

The setting of bistable storage device 317 at the completion of the comparison operation may thus be interpreted as indicating the equality or nonequality of the numbers being compared. If bistable storage device 317 remains in its initial state throughout the comparison operation, a digit by digit identity of the numbers is indicated and the numbers are therefore equal. If, on the other hand, bistable storage device 317 has been set to its other state during the course of the comparison operation a nonidentity between one or more corresponding digits of the two numbers is indicated and the numbers are therefore unequal. The sense of the nonidentity is indicated by bistable storage device 313.

A typical application of the electronic magnitude comparator of the present invention is that shown in applicant's co-pending application, Serial No. 189,318, filed October 10, 1950, now abandoned, which was continued as applicant's Serial No. 607,494, filed August 31, 1956, now U. S. Patent 2,803,401, wherein the structure of the present invention is disclosed as a "modified carry network" for forming the carry in the subtractors shown therein.

What is claimed as new is:

1. In a system for comparing and indicating the relative magnitudes of two binary numbers represented as electrical digit signal sets including one signal for each digit of the number represented, the digit signals being supplied in the order of least significant digit signal first, corresponding digit signals at the same time, the combination comprising: a bistable storage device having first and second input terminals; first means responsive to said corresponding digit signals for applying a signal to the first input terminal of said storage device to set said storage device to one of its stable states when said digit signals are dissimilar in one sense; and second means responsive to said corresponding supplied digit signals for applying a signal to the second input terminal of said storage device to set said bistable storage device to the other of its stable states when said corresponding digit signals are dissimilar in another sense.

2. In a system for comparing and indicating the relative magnitudes of two binary numbers represented as electrical digit signal sets including one signal for each digit of the number represented, the digit signals being supplied in the order of least significant digit signal first, corresponding digit signals at the same time, the combination comprising: a bistable storage device having first and second input terminals and being responsive to signals applied to said first and second input terminals, respectively, to set to one and another stable state, respectively; first means responsive to corresponding digit signals nonidentical in one sense for applying a signal to the first input terminal of said storage device to set said storage device to one of its stable states; and second means responsive to corresponding digit signals nonidentical in another sense for applying a signal to the second input terminal of said storage device to set said bistable storage device to another of its stable states.

3. A system for comparing and indicating the relative magnitudes of two binary numbers represented as electrical digit signal sets including one signal for each digit of the number represented, the digit signals being supplied in the order of least significant digit signal first, corresponding digit signals at the same time, the combination comprising: a bistable storage device; first and second source of input signals for supplying first and second electrical signal sets, respectively, representing in bilevel voltage form first and second numbers to be compared; first means responsive to corresponding digit signals of said first and second electrical signal sets for applying a signal to said storage device to set said storage device to a first one of its stable states when said corresponding digit signals are dissimilar in a first sense; and second means responsive to corresponding digit signals of said first and second electrical signal sets for applying a signal to said storage device to set said storage device to the other of its stable states when said corresponding digit signals are dissimilar in another sense.

4. An electronic magnitude comparator for comparing and indicating the relative magnitudes of first and second binary numbers, said comparator comprising: first means for producing a first series of bi-valued electrical digit signals representing, respectively, the digits of the first number; second means for producing a second series of bi-valued electrical signals representing, respectively, the digits of the second number; a bistable storage device; third means responsive to said signals for setting said bistable storage device to one of its stable states when corresponding digit signals of the two numbers being compared are dissimilar in one sense; and fourth means responsive to said signals for setting said bistable storage device to the other of its stable states when corresponding digit signals of the two numbers being compared are dissimilar in the opposite sense.

5. An electronic magnitude comparator for comparing and indicating the relative magnitudes of two binary numbers, represented by two sets of binary electrical signals, respectively, each set including one binary signal for each digit of the binary number represented, the binary signals in each set being arranged in time sequence, said comparator comprising: a bistable storage device; first logical gating means responsive to said digit signals to set said bistable storage device to one of its stable states when corresponding digit signals are non-identical in one sense; and second logical gating means responsive to said digit signals to set said bistable storage device to the other of its stable states when corresponding digit signals are non-identical in the opposite sense.

References Cited in the file of this patent

UNITED STATES PATENTS

| | | |
|---|---|---|
| 2,590,950 | Eckert et al. | Apr. 1, 1952 |
| 2,596,199 | Bennett | May 13, 1952 |
| 2,623,171 | Woods-Hill et al. | Dec. 23, 1952 |
| 2,646,501 | Eckert et al. | July 21, 1953 |
| 2,660,372 | Le Clerc | Nov. 24, 1953 |
| 2,762,564 | Samson et al. | Sept. 11, 1956 |

FOREIGN PATENTS

| | | |
|---|---|---|
| 1,040,913 | France | May 27, 1953 |